(12) United States Patent
Liu et al.

(10) Patent No.: US 10,021,968 B2
(45) Date of Patent: Jul. 17, 2018

(54) ROTARY SUPPORT AND TABLE ASSEMBLY

(71) Applicant: Dongguan Eagle Smart Home Technology Co., Ltd., Dongguan (CN)

(72) Inventors: Zongpu Liu, Dongguan (CN); Wei Lu, Dongguan (CN)

(73) Assignee: Dongguan Eagle Smart Home Technology Co., Ltd., Dongguan (CN)

( * ) Notice: Subject to any disclaimer, the term of this patent is extended or adjusted under 35 U.S.C. 154(b) by 6 days.

(21) Appl. No.: 15/349,232

(22) Filed: Nov. 11, 2016

(65) Prior Publication Data
US 2017/0295923 A1 Oct. 19, 2017

(30) Foreign Application Priority Data
Apr. 13, 2016 (CN) .................... 2016 2 0308563 U

(51) Int. Cl.
| | | |
|---|---|---|
| *A47B 21/06* | (2006.01) | |
| *A47B 11/00* | (2006.01) | |
| *A47B 23/02* | (2006.01) | |
| *A47C 7/68* | (2006.01) | |
| *H02J 7/02* | (2016.01) | |
| *H02J 7/00* | (2006.01) | |
| *H01R 13/24* | (2006.01) | |
| *H01R 39/64* | (2006.01) | |
| *H01R 13/62* | (2006.01) | |
| *H01R 13/73* | (2006.01) | |

(52) U.S. Cl.
CPC .............. *A47B 21/06* (2013.01); *A47B 11/00* (2013.01); *A47B 23/02* (2013.01); *A47C 7/68* (2013.01); *H01R 13/2471* (2013.01); *H01R 13/6205* (2013.01); *H01R 13/73* (2013.01); *H01R 39/64* (2013.01); *H02J 7/0052* (2013.01); *H02J 7/025* (2013.01); *A47B 2021/066* (2013.01); *A47B 2200/008* (2013.01); *H02J 2007/0062* (2013.01)

(58) Field of Classification Search
CPC .............. A47B 21/06; A47B 2200/008; A47B 2200/0081; A47B 2200/0082; A47B 2200/0083
USPC .......................................... 108/23, 50.02, 94
See application file for complete search history.

(56) References Cited

U.S. PATENT DOCUMENTS

| | | | | |
|---|---|---|---|---|
| 4,815,392 A | * | 3/1989 | Soot ........................ | A47B 13/10 108/65 |
| 4,852,500 A | * | 8/1989 | Ryburg .................. | A47B 21/03 108/105 |
| 4,879,955 A | * | 11/1989 | Moll .................... | A47B 17/003 108/50.02 |

(Continued)

*Primary Examiner* — Jose V Chen
(74) *Attorney, Agent, or Firm* — Shimokaji IP

(57) ABSTRACT

A rotary support includes a rotating member, a supporting member, an upper wire, a lower wire and a mounting base, the supporting member is held in the mounting base, the rotating member is inserted into the mounting base and rotatable relative to the supporting member, the upper wire is received in the rotating member and provided with an upper connector, the lower wire is received in the supporting member and provided with a lower connector, the upper connector and the lower connector is provided with a conductive recess and a conductive pin that are engaged one another. The upper wire can be freely rotated relative to the lower wire, thus the wires may not be damaged during the rotation of the table, and the rotation may not restricted by the wires. The connectors of the wires may be connected automatically to simplify the installation of the table.

13 Claims, 8 Drawing Sheets

(56) References Cited

U.S. PATENT DOCUMENTS

| | | | | |
|---|---|---|---|---|
| 5,535,684 A * | 7/1996 | John | A47B 11/00 | 108/142 |
| 5,638,758 A * | 6/1997 | Carr | A47B 21/06 | 108/150 |
| 5,761,785 A * | 6/1998 | Connolly | B23P 19/045 | 269/21 |
| 5,937,764 A * | 8/1999 | Olivier | A47B 11/00 | 108/20 |
| 6,113,086 A * | 9/2000 | Yonezawa | B25B 5/062 | 269/24 |
| 7,806,384 B2 * | 10/2010 | Doyle | B66F 1/08 | 108/50.02 |
| 7,859,836 B2 * | 12/2010 | Bae | A47B 21/00 | 108/50.02 |
| 8,186,281 B2 * | 5/2012 | Bastian | A47B 21/06 | 108/50.02 |
| 8,943,978 B2 * | 2/2015 | Soper | A47B 21/06 | 108/50.02 |
| 2003/0164120 A1 * | 9/2003 | Helle | A47B 9/10 | 108/94 |
| 2007/0227409 A1 * | 10/2007 | Chu | A47B 21/00 | 108/50.02 |
| 2007/0283860 A1 * | 12/2007 | Sun | A47B 11/00 | 108/94 |
| 2009/0078171 A1 * | 3/2009 | Frost | A47B 9/00 | 108/50.02 |
| 2012/0312196 A1 * | 12/2012 | Newkirk | H02J 7/025 | 108/23 |
| 2014/0053759 A1 * | 2/2014 | Matthai | A47B 21/0314 | 108/50.02 |
| 2014/0331901 A1 * | 11/2014 | Seefeldt | A47B 21/06 | 108/50.02 |
| 2015/0320203 A1 * | 11/2015 | Mandon | A47B 21/06 | 108/20 |

* cited by examiner

ROTARY SUPPORT AND TABLE ASSEMBLY

RELATED APPLICATIONS

This application claims the benefit of priority to Chinese Utility Model Application No. 201620308563.1, filed Apr. 13, 2016, which is hereby incorporated by reference in its entirety.

FIELD OF THE INVENTION

The invention relates to technical field of furniture pieces, and more particularly to a rotary support and a table assembly.

BACKGROUND OF THE INVENTION

Currently, a table assembly for mounting on furniture such as a sofa or a seat was developed. Such a table assembly includes a support connected with the sofa or the seat and a table supported by the support, the support is provided with a holding board whereby people can read or write thereon or mobile phones or computers can be carried thereon. For obtaining multiple using positions for the table, the table is capable of rotating at level plane; some tables may be integrated with a charging module or a lighting module, thus wires must be extended to the table to achieve the electric connection. When the table rotates, the wires in the support will be wrung together, which causes the table not to be further rotated and the wires to be damaged. Additionally, the assembly or disassembly for this table is time-consuming and inconvenient, because the conventional DC wire plug must be operated manually.

Therefore, there is a need for providing a table assembly that has simple structure and can prevent the wring and damage of the wires, to overcome the above-mentioned drawbacks.

SUMMARY OF THE INVENTION

One objective of the present invention is to provide a rotary support that can prevent the wires from being wrung and damaged.

Another objective of the present invention is to provide a table assembly having the rotary support.

To achieve the above-mentioned objectives, a rotary support comprises a rotating member, a supporting member, an upper wire, a lower wire and a mounting base, the supporting member being held in the mounting base, the rotating member being inserted into the mounting base and supported by the supporting member, and the rotating member being rotatable relative to the supporting member, the upper wire being received in the rotating member and provided with an upper connector, the lower wire being received in the supporting member and provided with a lower connector, one of the upper connector and the lower connector being provided with a conductive recess, another of the upper connector and the lower connector being provided with a conductive pin that is rotatably inserted into the conductive recess.

In comparison with the prior art, the rotating member and the supporting member are configured in the mounting base, when in use, the mounting base will be mounted on a sofa or a seat, and the rotating member will be fixed on the table, the rotating member will be rotated relative to the supporting member if the table is rotated, and the wires in the rotating member will be rotated accordingly. Since the conductive pin of the upper connector can be rotated relative to the conductive recess of the lower connector, thus the upper wire can be freely rotated relative to the lower wire. The wires may not be damaged during the rotation of the table, and the rotation of the table may not restricted by the wires, meanwhile the upper and lower wires are kept in electric connection during the rotation to maintain the normal operation of the table. In addition, when assembly, the upper wire and the lower wire will be connected automatically if the rotating member is inserted in to the mounting base; and the disassembly can be achieved by drawing out the rotating member, it's unnecessary to disconnect the upper connector and the lower connector, thus the assembly and disassembly for the table assembly are easy.

Preferably, the mounting base is provided with a main body and a limiting portion that is fixed on an upper end of the main body and expanded from the main body, screw threads are provided on an outer wall of the main body, and a nut is provided to connect with the screw threads. During the assembly, the main body of the mounting base passes through the hole on the furniture, and then the nut is screwed on the main body to clamp the furniture, so that the mounting base can be mounted on the furniture stably.

Preferably, the mounting base is provided with a supporting surface that is upward, and an upper end of the supporting member is provided with a first shoulder surface that is downward and pressed against the supporting surface. In such a way, the supporting member is unidirectionally positioned in the mounting base, and could not move downward.

Preferably, a through hole is provided on a bottom of the mounting base to allow the supporting member to pass, the supporting member is provided with a second shoulder surface that is located below the first shoulder surface, and the second shoulder surface is pressed against an inner surface of the bottom. The second shoulder surface is benefit to enhance the support force of the mounting base.

Preferably, the rotary support further comprises an elastic member which is received in the mounting base and set around the supporting member, after the rotating member is withdrawn from the mounting base, the elastic member pushes against the supporting member.

Preferably, a lower end of the supporting member is provided with a restricting plane that is upward, and a top of the supporting member is flush with that of the mounting base when the restricting plane upward urges the bottom of the mounting base. Since the tops are flush, thus no hollow appears at the upper end of the rotary support, which brings a good appearance.

Preferably, two spaced clips are provided on the lower end of the supporting member, each clip is provided with the restricting plane and an actuating incline plane that is located below the restricting plane, and the actuating incline plane downward urges the mounting base to furl the clips. In such a way, when the supporting member is mounted to the mounting base, the actuating incline plane will actuate the clips to furl, so that the lower end of the supporting member can pass through the mounting base smoothly; when the clips are extended from the mounting base, the clips are restored, and the distance between the two restricting planes is larger than the diameter of the through hole of the mounting base to restrict the supporting member to move upward.

Preferably, a first adsorbing member is embedded in the upper connector, a second adsorbing member is embedded in the lower connector, the first adsorbing member and the second adsorbing member are adsorbed each other. In such a way, the connection between the two connectors is quick and stable.

Preferably, the first adsorbing member and the second adsorbing member are two magnets that are adsorbed each other.

A table assembly includes a table and a rotary support mentioned above, the table is supported on the rotary support, and an upper end of the upper wire is extended into the table.

In comparison with the prior art, since the table assembly includes the rotary support mentioned above, thus the wires may not be damaged during the rotation of the table, and the rotation of the table may not restricted by the wires, meanwhile the upper and lower wires are kept in electric connection during the rotation to maintain the normal operation of the table. In addition, when assembly, the upper wire and the lower wire will be connected automatically if the rotating member is inserted in to the mounting base; and the disassembly can be achieved by drawing out the rotating member, it's unnecessary to disconnect the upper connector and the lower connector, thus the assembly and disassembly for the table assembly are easy.

Preferably, a wireless charging module is configured in the table, to achieve wireless charging.

Preferably, a USB charging module is configured in the table, to achieve wireless charging.

Preferably, a Bluetooth speaker module is configured in the table, to achieve audio playing.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
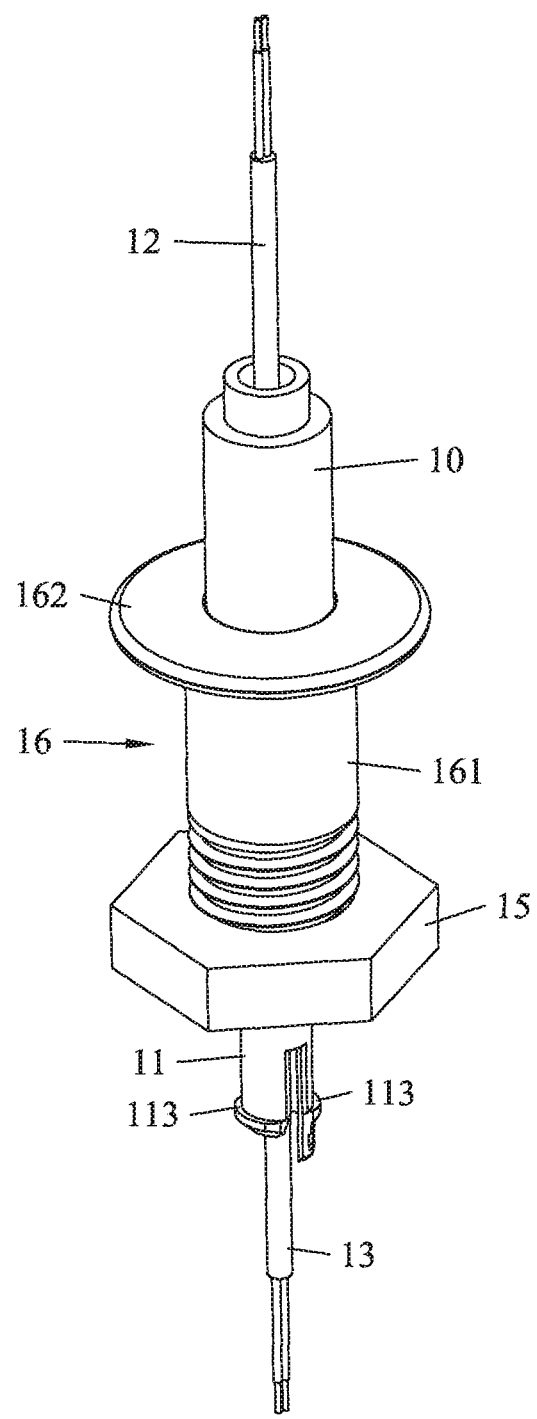
FIG. 1 is a perspective view of a rotary support according to the present invention.

Referring to FIGS. 1 to 4, the present invention provides a rotary support 1 that is installed on furniture such as a sofa or a seat to support a table. The rotary support 1 includes a rotating member 10, a supporting member 11, an upper wire 12, a lower wire 13, an elastic member 14, a nut 15 and a mounting base 16 that is hollow.

The mounting base 16 is a rotating structure which includes a main body 161 and a limiting portion 162 expanded from the main body 161. An opening is formed on the top of the limiting portion 162 and through the main body 161, and the outer wall of the main body 161 are provided with screw threads. The sofa or seat has a flat board that is adapted for installing the rotary support 1, and a hole is formed on the flat board whereby the main body 161 of the mounting base 16 passes through, and then the nut 15 is screwed on the main body 161, so that the mounting base 16 and the rotary support 1 is mounted on the furniture. The bottom 163 of the mounting base 16 has a through hole 164, and the mounting base 16 has an annular supporting surface 165.

The rotating member 10 is a hollow and rotating structure, and the upper wire 12 is received in the rotating member 10 and has an upper connector 121. The bottom of the upper connector 121 is flush with the bottom of the rotating member 10. The upper connector 121 includes a conductive pin 122 located at the center, an isolation layer 123 around the conductive pin 122, a conductive layer 126 around the isolation layer 123, a first adsorbing member 124 and a protection cover 125 covering on the first adsorbing member 124. Preferably, the conductive pin 122 and the conductive layer 126 are made of material having excellent conductivity, such as wear resistant metal. Specifically, the conductive pin 122 and the conductive layer 126 are served as the anode and the cathode of the upper wire 12, namely the fire wire and the zero line. The isolating layer 123 and the protection cover 125 are made of insulating material, and the conductive pin 122 is insulated from the conductive layer 126 due to the isolating layer 123.

The supporting member 11 is hollow and has three telescopic sections, specifically, the upper section, the middle section and the upper end of the lower section are rotating structures, and the lower end of the lower section has two spaced clips 110. The upper section has a diameter larger than that of the middle section, and the diameter of the middle section is larger than that of the lower section, as a result, the supporting member 11 form a first shoulder surface 111 and a second shoulder surface 112 that is located below the first shoulder surface 111. Each clip has a restricting plane 113 that is upward and in arc shape, and the restricting plane 113 is extended from a side of the clip 110. Further, each clip 110 has an actuating incline plane 114 located below the restricting plane 113.

The lower wire 13 is received in the supporting member 11 and has a lower connector 131 whose top is flush with the top of the supporting member 11. The lower connector 131 includes a conductive recess 132 located at the center, an isolation layer 133 around the conductive recess 132, a conductive layer 136 around the isolation layer 133, a second adsorbing member 134 and a protection cover 135 covering on the second adsorbing member 134. Preferably, the conductive recess 132 and the conductive layer 136 are made of material having excellent conductivity, such as wear resistant metal. Specifically, the conductive recess 132 and the conductive layer 136 are served as the anode and the cathode of the lower wire 13, namely the fire wire and the zero line. The first adsorbing member 124 and the second adsorbing member 134 are adsorbed each other. The isolating layer 133 and the protection cover 135 are made of insulating material, and the conductive recess 132 is insulated from the conductive layer 136 due to the isolating layer 133. The conductive pin 122 can be inserted into the conductive recess 132, and the conductive layers 126, 136 are contact with each other, in such a way, the upper wire 12 and the lower wire 12 are connected electrically. Furthermore, the conductive pin 122 can be rotated in the conductive recess 132.

In the present embodiment, the elastic member 14 is a compressed spring which is sized to receive the middle section of the supporting member 11.

During the assembly, the elastic member 14 is placed in the mounting base 16, and the supporting member 11 together with the lower wire 13 are placed in the mounting base 16 in turn so that the lower section of the supporting member 11 passes through the elastic member 14 and aligns with the through hole 164 on the bottom 163. And then, the rotating member 10 together with the upper wire 12 are placed in the mounting base 16, so that the rotating member 10 is pressed against the supporting member 11 to connect the upper connector 121 with the lower connector 131. Under the gravity action of the rotating member 10 (together with the table thereon), the supporting member 11 is pressed, meanwhile the elastic member 14 is pressed accordingly. When the actuating incline plane 114 at the lower end of the clip 110 is contacted with the wall of the through hole 164 on the bottom 163, two clips 110 will be extruded and furled, so that the lower section of the supporting member 11 can be extended from the through hole 164. Finally, the first shoulder surface 111 of the supporting member 11 is downward pressed against the supporting surface 165, the second shoulder surface 112 is downward pressed against the inner surface of the bottom 163, the supporting member 11 is held in the mounting base 16, the upper end of the elastic member 14 is pressed against the first shoulder surface 111, and the restricting plane 113 of the supporting member 11 is faced to the bottom 163.

In an embodiment, the first adsorbing member 124 and the second adsorbing member 134 are two magnets that are adsorbed each other, in such a way, the upper connector 121 and the lower connector 131 may be connected automatically during the assembly.

After the assembly, the rotating member 10 can be rotated relative to the supporting member 11, and the upper wire 12 also can be freely rotated relative to the lower wire 13. The conductive pin 122 is maintained to contact with the conductive recess 132 during the rotation of the upper wire 12, thus the upper wire 12 is electrically connected to the lower wire 13 stably. In other embodiments, the conductive recess 132 can be configured on the upper connector 121, while the conductive pin 122 is configured on the lower connector 131.

If the rotating member 10 is removed, the supporting member 11 will be raised under the spring action of the elastic member 14, until the restricting plane 113 is pressed against the bottom 163 of the mounting base 16, the top of the supporting member 11 is flush with the top of the mounting base 16.

Figure 2:
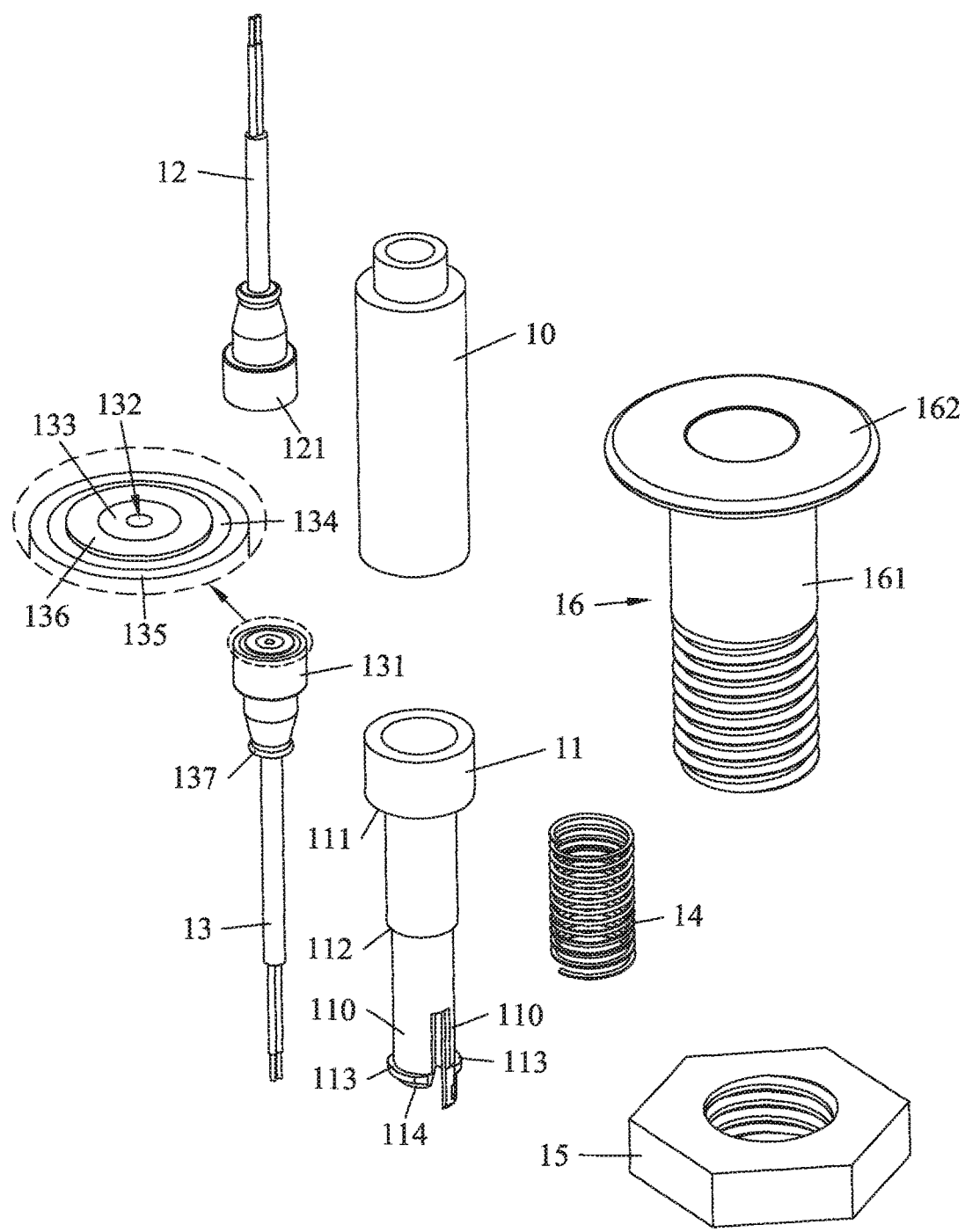
FIG. 2 is an exploded view of a rotary support according to the present invention.
Figure 3:
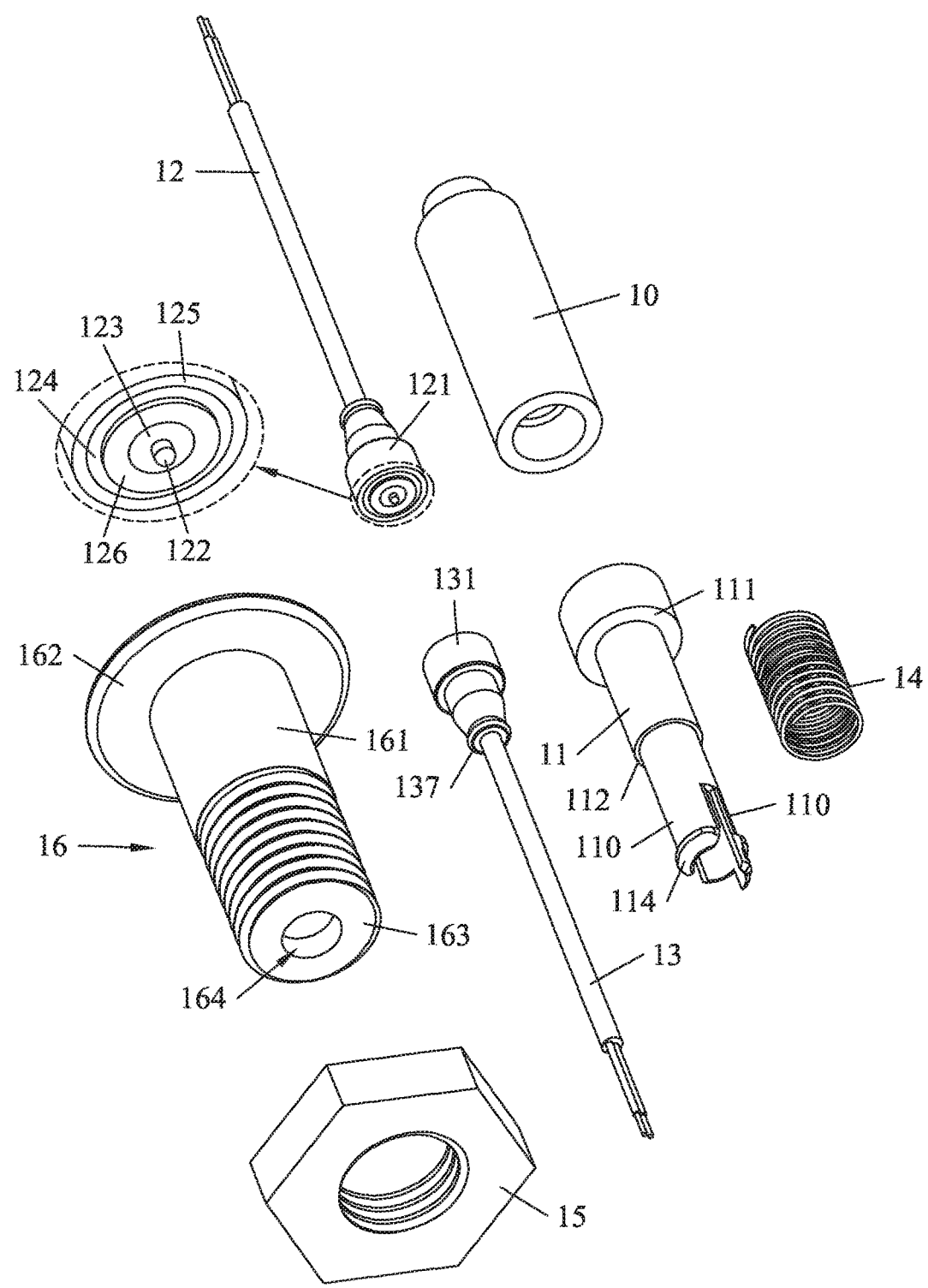
FIG. 3 is another exploded view of the rotary support.
Figure 4:
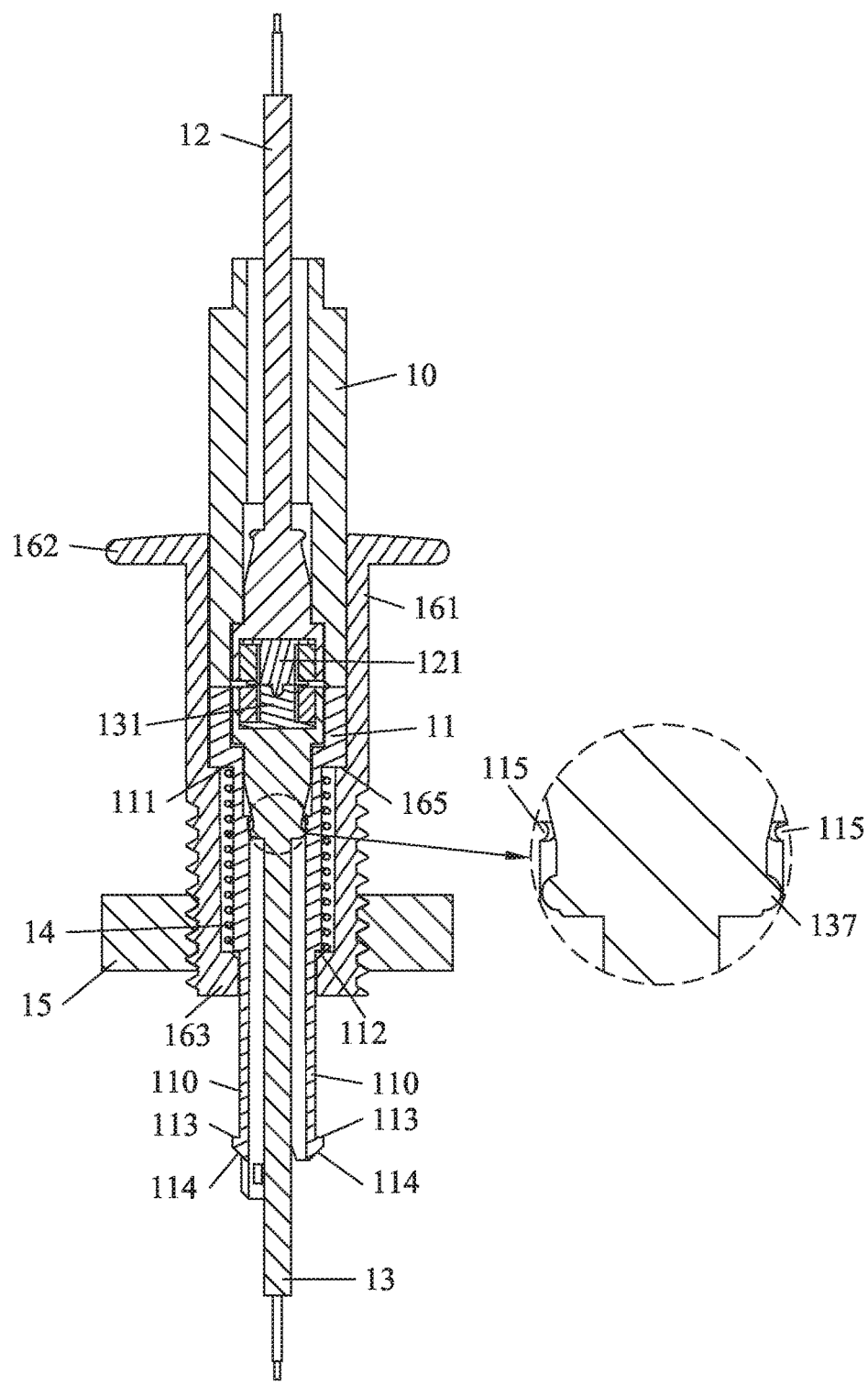
FIG. 4 is a sectional view of rotary support.

Referring to FIGS. 2-4, an annular protrusion 137 is formed on the end of the protection cover 135 in the lower connector 131, and two ribs 115 in arc shape are formed on the inner wall of the supporting member 11. When the lower wire 13 is mounted on the supporting member 11, the protrusion 137 is located below the ribs 115; if the table and the rotating member 10 are removed, the upper connector 121 is removed accordingly which may cause a raise trend of the lower wire 13, under this condition, the ribs 115 will restrict the protrusion 137 to prevent the lower connector 131 from raising, so that the lower wire 13 will not be pulled out.

Figure 5:
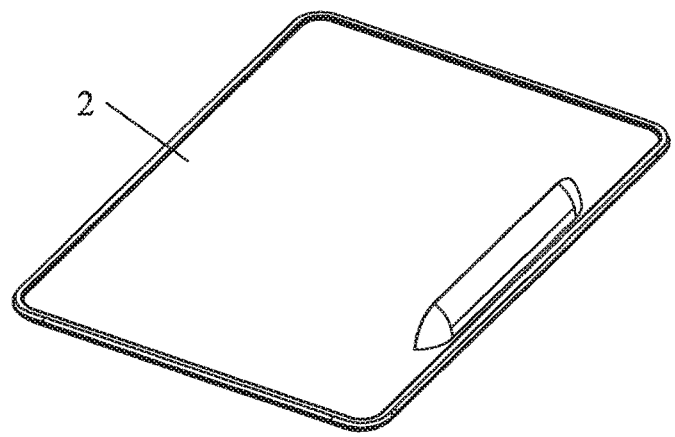
FIG. 5 is a structure view of a table assembly according to the present invention.
Figure 5:
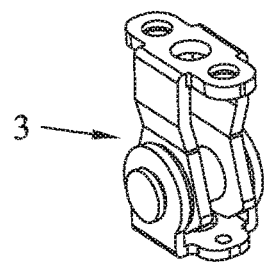
Figure 5:
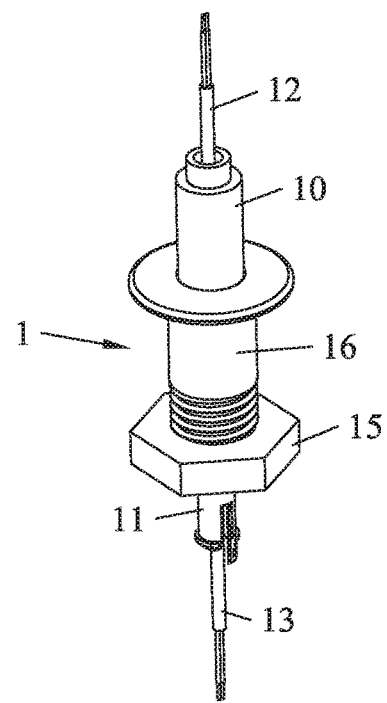

FIG. 5 shows a table assembly which includes a table 2, an angle adjustment mechanism 3 and a rotary support 1 mentioned above. Specifically, the table 2 is fixed on the angle adjustment mechanism 3 which is fixed on the rotating member 10, and the upper wire 12 of the rotary support 1 is extended into the table 2 to supply power for the components in the table 2. When the rotating member 10 is rotated, the table 2 and the angle adjustment mechanism 3 are rotated on the level plane.

Figure 6:
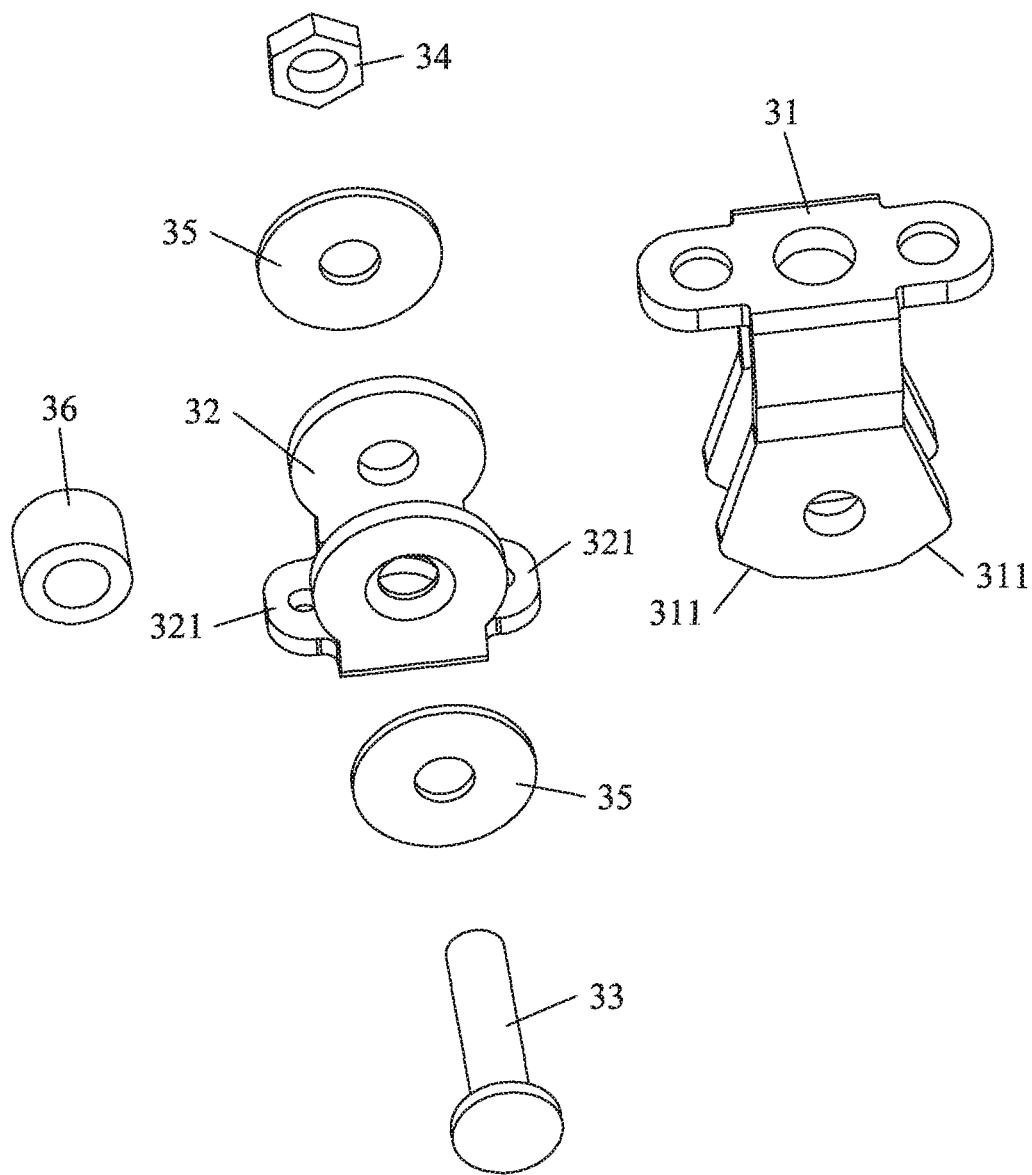
FIG. 6 is an exploded view of a rotating member of the table assembly.

As shown in FIG. 6, the angle adjustment mechanism 3 includes an upper fixing member 31 fixed on the table 2 and a lower fixing member 32 fixed on the rotating member 10.

The upper fixing member 31 is pivotally connected with the lower fixing member 32 by means of a bolt 33 and a nut 34. Two gaskets are arranged between the upper fixing member 31 and the lower fixing member 32 to reduce rigid friction, and a ring 36 is formed around the bolt 33 to prevent the distortion of the upper fixing member 31.

A retaining surface 311 is formed at each side of the upper fixing member 31, and a stopper 321 is formed at each side of the lower fixing member 32, When the upper fixing member 31 swings with the maximum angle on the lower fixing member 32, the retaining surface 311 will be obstructed by the stopper 321 to restrict the further swing. By this token, the swing angle of the upper fixing member 31 may be limited by means of the cooperation between the retaining surface 311 and the stoppers 321, namely the angle range of the table 2 may be limited.

Figure 7:
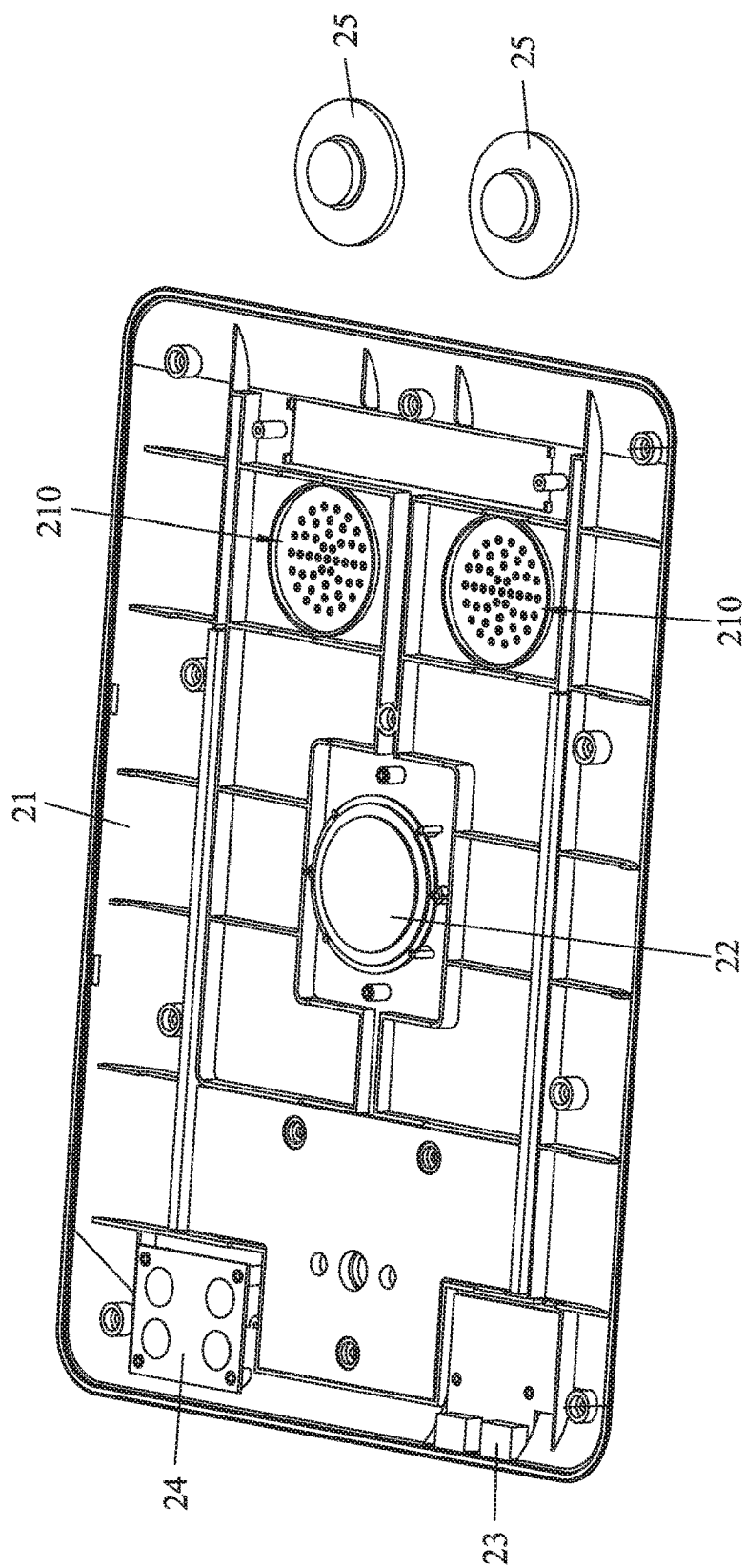
FIG. 7 shows modules in the table assembly.
Figure 8:
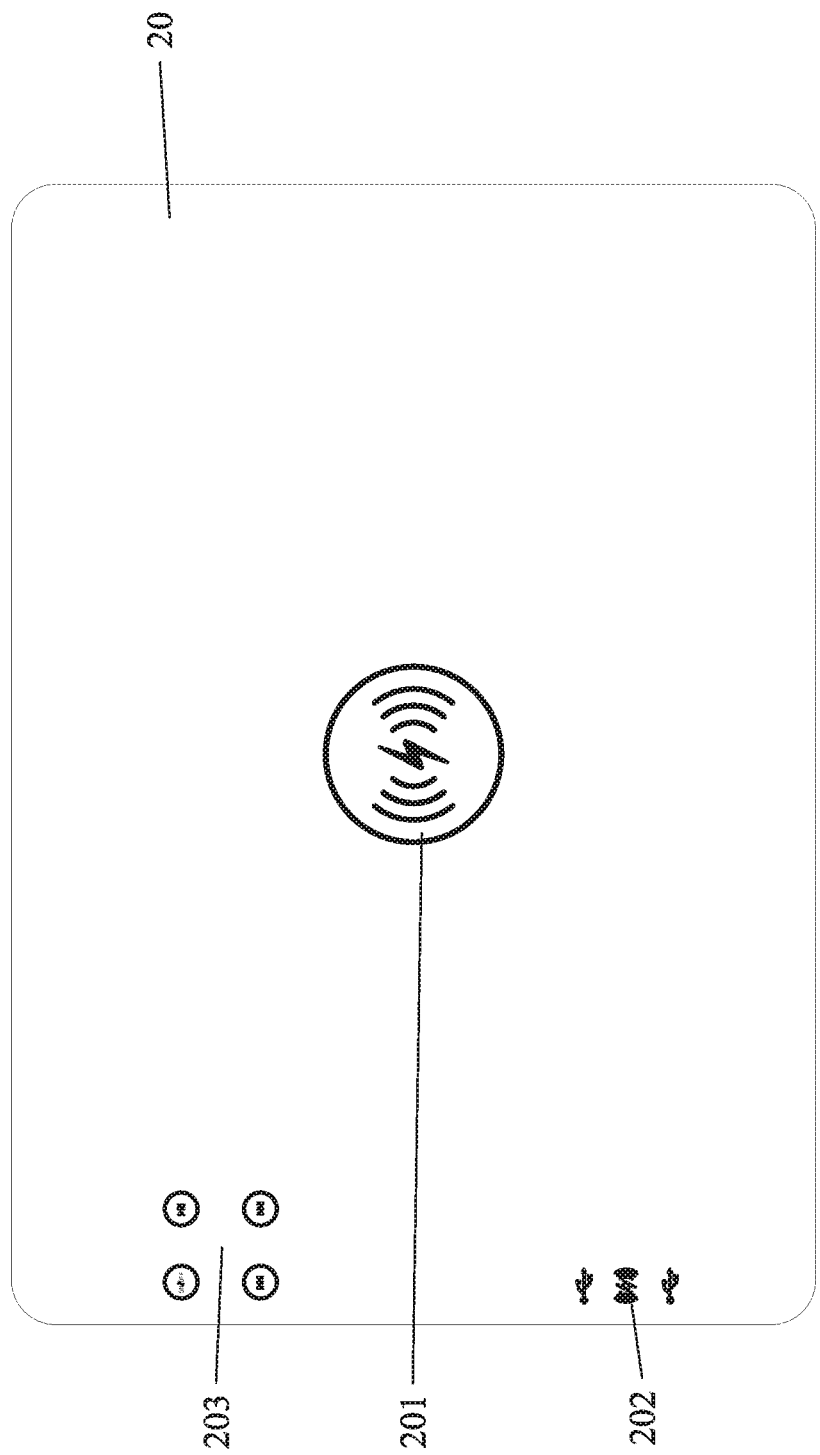
FIG. 8 shows the prints on the top of the table assembly.

Referring to FIGS. 7 and 8, the table 2 includes a bottom housing 21 and a top plate 20 covering on the bottom housing 21. Specifically, the top plate 20 is made of acrylic and is printed with markers. The bottom housing 21 are provided with a wireless charging module 22, a USB charging module 23 and a Bluetooth speaker module, and the Bluetooth speaker module may include Bluetooth speaker touch circuit board 24 and two speakers 25. The two speakers 25 are received in two holes 210 on the bottom housing 21. According to the modules in the bottom housing 21, the top plate 20 may be printed with markers showing the wireless charging region 201, USB charging region 202 and a touch key region 203. In other embodiments, the top plate 20 may be made of aluminum alloy plate or wood plate.

In comparison with the prior art, since the conductive pin 122 of the upper connector 121 can be rotated relative to the conductive recess 132 of the lower connector 131, thus the upper wire 12 can be freely rotated relative to the lower wire 13. The wires may not be damaged during the rotation of the table 2, and the rotation of the table 2 may not restricted by the wires, meanwhile the upper and lower wires 12, 13 are kept in electric connection during the rotation to maintain the normal operation of the table 2. In addition, when assembly, the upper wire 12 and the lower wire 13 will be connected automatically if the rotating member 10 is inserted in to the mounting base 16; and the disassembly can be achieved by drawing out the rotating member 10, it's unnecessary to disconnect the upper connector 121 and the lower connector 131, thus the assembly and disassembly for the table assembly are easy.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A rotary support, comprising a rotating member, a supporting member, an upper wire, a lower wire and a mounting base, the supporting member being inserted into in the mounting base, the rotating member being inserted into the mounting base and supported by the supporting member, and the rotating member being rotatable relative to the supporting member, the upper wire being received in the rotating member and provided with an upper connector, the lower wire being received in the supporting member and provided with a lower connector, one of the upper connector and the lower connector being provided with a conductive recess, another of the upper connector and the lower connector being provided with a conductive pin that is inserted into the conductive recess and rotatable in the conductive recess.

2. The rotary support according to claim 1, wherein the mounting base is provided with a main body and a limiting portion that is fixed on an upper end of the main body and expanded from the main body, screw threads are provided on an outer wall of the main body, and a nut is provided to connect with the screw threads.

3. The rotary support according to claim 1, wherein the mounting base is provided with a supporting surface that is upward, and an upper end of the supporting member is provided with a first shoulder surface that is downward and supported against the supporting surface.

4. The rotary support according to claim 3, wherein a through hole is provided on a bottom of the mounting base to allow the supporting member to pass, the supporting member is provided with a second shoulder surface that is located below the first shoulder surface, and the second shoulder surface is supported against an inner surface of the bottom.

5. The rotary support according to claim 3, further comprising an elastic member which is received in the mounting base and set around the supporting member, after the rotating member is withdrawn from the mounting base, the elastic member pushes against the supporting member.

6. The rotary support according to claim 5, wherein a lower end of the supporting member is provided with a restricting plane that is upward, and a top of the supporting member is flush with that of the mounting base when the restricting plane is upwardly abutted against the bottom of the mounting base.

7. The rotary support according to claim 6, wherein two spaced clips are provided on the lower end of the supporting member, each clip is provided with the restricting plane and an actuating incline plane that is located below the restricting plane, and the actuating incline plane is downwardly abutted against the mounting base to furl the clips.

8. The rotary support according to claim 1, wherein a first adsorbing member is embedded in the upper connector, and a second adsorbing member is embedded in the lower connector.

9. The rotary support according to claim 8, wherein the first adsorbing member and the second adsorbing member are two magnets.

10. A table assembly, comprising a table and a rotary support according to claim 1, the table being supported on the rotary support, and an upper end of the upper wire being extended into the table.

11. The table assembly according to claim 10, wherein a wireless charging module is configured in the table.

12. The table assembly according to claim 10, wherein a USB charging module is configured in the table.

13. The table assembly according to claim 10, wherein a Bluetooth speaker module is configured in the table.

* * * * *